United States Patent Office 3,649,628
Patented Mar. 14, 1972

3,649,628
PROCESS FOR PRODUCING SUBSTITUTED CYCLOHEXENE COMPOUNDS
Robert M. Novack, Mendham, N.J., assignor to Warner-Lambert Company, Morris Plains, N.J.
No Drawing. Continuation-in-part of application Ser. No. 727,689, May 8, 1968. This application Nov. 19, 1968, Ser. No. 777,202
Int. Cl. C07c 101/42
U.S. Cl. 260—247.2 B
12 Claims

ABSTRACT OF THE DISCLOSURE

A process is described which comprises the steps of (1) reacting an amine having the formula

II with an aldehyde having the formula:

$$R_4—CH_2—CR_4=CR_4—CHO \qquad III$$

in the presence of a dehydrating agent, and optionally a quinone catalyst, there being present in the reaction mixture a ratio of from about 0.5 mole to about 1.0 mole of the Formula II amine for each mole of the Formula III aldehyde present therein; and (2) condensing the reaction product, thus obtained, with a compound having the formula:

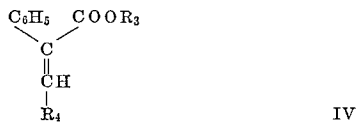

IV there being present in the reaction mixture a ratio of about 0.45 mole of Formula IV compound for each mole of the Formula III compound employed in step (1) of the process, said process yielding a substituted cyclohexene compound having the formula:

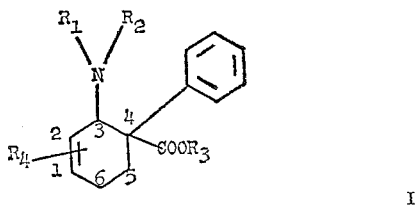

I the symbols $R_1$, $R_2$, $R_3$ and $R_4$, wherever they appear in Formulas I, II, III and IV, having the following meanings: $R_1$ is a straight or branched lower alkyl group; $R_2$ is a straight or branched chain lower alkyl group; or $R_1$ and $R_2$, taken together with the nitrogen atom to which they are attached, form a heterocyclic ring system; $R_3$ is a straight or branched chain lower alkyl group; and $R_4$ is hydrogen or one or more straight or branched chain lower alkyl groups. In Formulas III and IV, each group represented by the symbol $R_4$ may be hydrogen or one or more or all may be lower alkyl groups. Where $R_4$ represents two or more alkyl groups, such groups may be the same or different.

Certain compounds which fall within the genus of Formula I are claimed in U.S. patent application Ser. No. 587,673 filed Oct. 19, 1966, now abandoned, wherein they are described as being therapeutically useful as analgesics.

CROSS REFERENCE TO RELATED APPLICATIONS

This application is a continuation-in-part of my U.S. patent application Ser. No. 727,689, filed May 8, 1968, now abandoned.

BRIEF DESCRIPTION OF THE INVENTION

U.S. patent application Ser. No. 587,673, filed Oct. 19, 1966 relates to certain of the substituted cyclohexene compounds embraced by Formula I. The application describes the compounds and a method for producing same and it discloses their utility as analgesics.

The present invention relates to an improved method for producing the compounds of Formula I. The process involves the first step of reacting an amine of Formula II with an aldehyde of Formula III, using such quantities of amine and aldehyde to provide a reaction mixture containing a ratio of from about 0.5 mole to about 1.0 mole of the Formula II amine for each mole of the Formula III aldehyde. The reaction comprising the first step of the process is carried out at a relatively low temperature, in the presence of a dehydrating agent and, optionally, a quinone catalyst. In the second step of the preparative method, the reaction product of the first step, without being isolated, is condensed with the ester of Formula IV. This reaction is carried out at an elevated temperature using a ratio of about 0.45 mole of the Formula IV ester for each mole of Formula III aldehyde originally used.

The two step process yields a product of Formula I in the form of a mixture of two isomeric compounds, namely, 3-cis $R_1R_2$ amino-4-phenyl-4-cis-COOR$_3$-$\Delta^1$-$R_4$ cyclohexene and 3-trans $R_1R_2$ amino-4-phenyl-4-trans-COOR$_3$-$\Delta^1$-$R_4$ cyclohexene. The cis- and trans-isomers can be isolated readily by any one of several methods.

DETAILED DESCRIPTION

The present invention involves the steps of (1) Reacting an amine having the formula:

II with an aldehyde having the formula:

$$R_4—CH_2—CR_4=CR_4—CHO \qquad III$$

under the conditions hereinafter described; and (2) Condensing the reaction product obtained from step (1) with an ester having the formula:

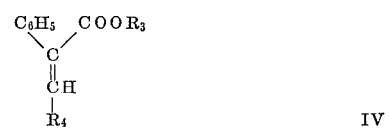

IV to produce a substituted cyclohexene compound having the formula:

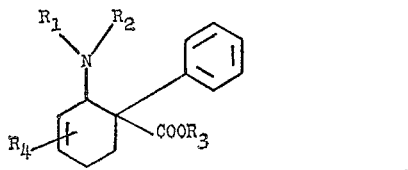

I

Wherever they appear in Formulas I, II, III and IV, the symbols $R_1$, $R_2$, $R_3$ and $R_4$ have the following meanings: $R_1$ represents a straight or branched chain lower alkyl group, such as, methyl, ethyl, propyl, isopropyl, butyl, isobutyl, etc.; $R_2$ represents a straight or branched chain lower alkyl group, such as, methyl, ethyl, propyl, isopropyl, butyl, isobutyl, etc.; or, where taken together, with the nitrogen atom to which they are attached, $R_1$ and $R_2$ represent a heterocyclic ring system, such as, pyrrolidinyl, morpholinyl, piperidinyl, etc.; $R_3$ represents a straight or branched chain lower alkyl group, such as, methyl, ethyl, propyl, isopropyl, butyl, isobutyl, etc.; and $R_4$ represents hydrogen or one or more straight or branched chain lower alkyl groups, such as, methyl, ethyl, propyl, isopropyl, butyl, isobutyl, etc. In Formulas III and IV, each group represented by the symbol $R_4$ may be hydrogen or one or more or all may be lower alkyl groups. Where $R_4$ represents two or more alkyl groups, such groups may be the same or different.

The compounds of Formula I are readily converted into medicinally acceptable acid addition salts by conventional methods.

In carrying out the first step of the process, namely, the reaction of the amine of Formula II with the aldehyde of Formula III, the use of an inert solvent, such as, benzene, toluene, ether, etc. is optional. In the preferred practice of the invention, however, a solvent, particularly, benzene, is employed. Furthermore, the reaction is carried out in the presence of a dehydrating agent and, optionally but preferably, in the presence of a catalytic amount of a quinone catalyst. In general, any conventional dehydrating agent can be used. However, potassium carbonate is preferably employed. The dehydrating agent serves to remove the water which is formed by the reaction of the Formulas II and III compounds thereby aiding in the reduction of the formation of an undesired propionate impurity. As the quinone catalyst, phenanthrenequinone or chrysenequinone are preferably used. However, other known quinone catalysts can be employed, if desired.

The reaction of the Formula II amine with the Formula III aldehyde is carried out at a temperature within the range of from about $-25°$ C. to about $+30°$ C. Sufficient quantities of the Formula II amine and Formula III aldehyde must be used to provide a reaction which contains a ratio of from about 0.5 to about 1.0 mole of the amine for each mole of aldehyde present therein. In the preferred embodiment of the invention, a ratio of about 0.5 mole of the Formula II amine is present in the reaction mixture for each mole of the Formula III aldehyde present therein. Furthermore, the dehydrating agent is present in the reaction mixture in a molar amount equal to the molar concentration of the Formula II amine. The time required to bring the reaction of the amine and aldehyde to completion is variable. It has been found, however, that generally the reaction will proceed to completion within a period of 45 minutes to 90 minutes when the amine is introduced into the mixture containing the aldehyde and dehydrating agent gradually throughout that period.

In the second step of the process, the ester of Formula IV is added to the reaction mixture produced in the first step and the total mixture is heated at a temperature within the range of from about 50° C. to about 160° C. The reaction may be carried out in an autoclave, if necessary or desirable. Under ordinary circumstances, the reaction proceeds to completion in a period of from about 2 hours to about 20 hours. In this step of the process, a sufficient quantity of the Formula IV ester should be incorporated into the reaction mixture to provide a ratio of about 0.45 mole of ester for each mole of aldehyde used in the first step.

The manner in which the reaction mixture is worked up to obtain the reaction product will be readily apparent to persons skilled in the art. Full details of specific methods are set forth in the working examples hereof. The reaction product is, however, washed with an aqueous solution of an alkali metal bisulfite, for example, a 10% aqueous solution of sodium bisulfite, to remove any aldehydic impurity formed during the reaction. The bisulfite wash also conditions the reaction product for the separation of its isomeric components.

The present process produces a product which is a mixture of two isomeric compounds, namely, 3-cis $R_1R_2$ amino-4-phenyl-4-cis-$COOR_3$-$\Delta^1$-$R_4$ cyclohexene and 3-trans $R_1R_2$-amino-4-phenyl-4-trans-$COOR_3$-$\Delta^1$-$R_4$ cyclohexene. The cis-isomer can be represented by the formula:

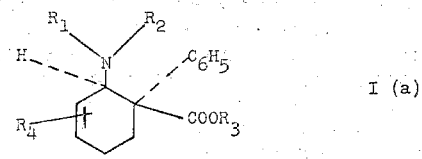

I (a)

while the trans-isomer can be represented by the formula:

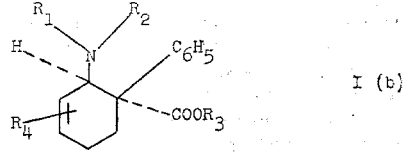

I (b)

the symbols $R_1$, $R_2$, $R_3$ and $R_4$ having the same meaning as in Formula I.

The compounds of Formula I, both the cis- and trans-isomers, exhibit analgesic activity. However, the trans-isomers have been found to possess a higher degree of activity than the corresponding cis-isomers. A method for separating and isolating the cis- and trans-isomers from the isomeric mixture is disclosed in U.S. patent application Ser. No. 587,673. This method involves the formation of the hydrochloride salts of the cis- and trans-isomers by dissolving the reaction product containing the isomeric mixture in a suitable common solvent, for example, ether, and adding to such solution a sufficient quantity of hydrogen chloride to form the cis- and trans-hydrochloride salts. The salts are thereafter separated by a crystallization step. In the crystallization step, a solvent mixture comprising about 10 parts by volume of ethyl acetate and about 1 part by volume of methyl ethyl ketone is employed. Because the 1.5 hydrate of the cis-isomer is less soluble in the described solvent mixture, a quantity of water sufficient to cause the formation of the 1.5 hydrate of the cis-isomer is added to the mixture of isomers dissolved in the solvent mixture. The cis-isomer readily precipitates out of solution in the form of its hydrate. The trans-isomer, which remains in solution in the solvent mixture, can be recovered by removal of the solvent.

An alternate method for separating the cis- and trans-isomers from an isomeric mixture such as is produced in the practice of this invention is disclosed in U.S. patent application Ser. No. 690,794, filed Dec. 15, 1967, now abandoned. In the alternate method, the isomeric mixture is dissolved in a strong mineral acid, for example, hydrochloric acid, and the solution is adjusted to a pH of from about 2.5 to about 3.5. An aqueous solution containing from about 15% to about 40%, preferably about 20%, of zinc chloride is gradually added to the acidic solution of the isomeric mixture until crystals of a zinc chloride complex begin to appear. Zinc chloride reacts specifically with the cis-isomer to form a complex made up of the zinc chloride and the cis-isomer. The complex comes out of solution while the trans-isomer, which does not react with the zinc chloride, remains dissolved in the acidic solution. The insoluble complex of zinc chloride and the cis-isomer can be separated from the soluble trans-isomer by filtration.

The pure cis-isomer can be regenerated readily from the zinc chloride complex. The complex is added to an organic solvent, such as, chloroform, methylene chloride or benzene containing from 10% to 20% of ethyl acetate. Chloroform is preferably employed. A strong base, such as, concentrated ammonia, is added to obtain a pH of from about 8.5 to about 9.5. The organic phase of the system is separated and the cis-isomer, which is present therein, is recovered by fractionation.

The pure trans-isomer is readily recovered from the acidic solution. This can be accomplished by adding an organic solvent, preferably chloroform, to the acidic solution in which the trans-isomer remains dissolved. The mixture is then made alkaline, preferably using concentrated aqueous ammonia. The pure trans-isomer is obtained from the alkaline mixture by dissolving the organic residue in a mixture of ethyl acetate and methyl ethyl ketone. A concentrated solution of gaseous hydrochloric acid is added to obtain a pH of from about 3.5 to about 4. The hydrochloride salt of the pure trans-isomer precipitates from the acidic solution. The salt is recovered by filtration and recrystallized.

The cyclohexene bases which are produced by the method of this invention can be converted into medicinally acceptable acid addition salts by conventional methods. For example, salts can be obtained by the reaction of a stoichiometrically equivalent quantity of the base and the desired acid in an inert common solvent. As used herein, the expression "medicinally acceptable acid addition salts" denotes salts of the cyclohexene bases with medicinally acceptable acids. Such salts are no more toxic than the bases from which they are prepared and they possess such physical properties and characteristics as render them suitable for incorporation into dosage forms in combination with conventional pharmaceutical adjuvants and excipients. Such acids include, for example, inorganic acids, such as, hydrochloric acid, nitric acid, phosphoric acid, sulfuric acid, etc. and organic acids, such as, acetic acid, benzoic acid, citric acid, maleic acid, salicylic acid, tartaric acid, etc.

The formation of the hydrochloride salt of the transisomer, by the method described hereinafter, provides an effective means of further purifying the compound. In the method, equal molar proportions of the trans-isomer base, which can be crude or substantially pure, and hydrogen chloride are taken up in ethyl acetate and the mixture, adjusted to pH of from about 3.5 to 4, is heated to reflux temperature. The mixture, while hot, is filtered to obtain the insoluble hydrochloride salt of the trans-isomer. It has been found that, by removing the salt of the trans-isomer from the reaction mixture while the latter is still hot, the product contains less cis-isomer and propionate impurity than it would have contained if the reaction mixture was cooled prior to filtration. The propionate impurity to which reference is made herein has the structural formula:

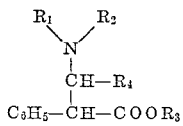

The hydrochloride salt of the trans-isomer can be further purified, if necessary or desirable. This can be accomplished by stirring the salt in a suitable, inert organic solvent, for example, tetrahydrofuran, at a temperature up to about 25° C. or ethyl acetate at a temperature of up to about 75° C. The purified salt is, thereafter, collected by filtration and washed and dried.

The compounds which are produced by the present process are disclosed in U.S. patent application Ser. No. 587,673 as possessing potent analgesic activity in mammals and as being used as analgesics. In use, the compounds are admixed with conventional pharmaceutical adjuvants and excipients, for example, lactose, water, alcohol, etc., and formulated into dosage forms, such as, tablets, solutions for injection, elixers, etc. The compounds are administered per os to mammals, such as, rats, rabbits, cats, dogs, etc. in a dosage of from about 15 mg./kg. to about 50 mg./kg., preferably 25 mg./kg., of body weight. For example, a dosage of from about 20 mg./kg. to about 40 mg./kg. of body weight produces marked analgesia in the dog.

The present invention represents a substantial advance in the art. The process, which is disclosed in U.S. patent application Ser. No. 587,673, requires the use of an aminobutadiene compound as one of the starting materials. It has been found that, when the cyclohexene compounds of Formula I are produced from an aminobutadiene compound, a substantial quantity of a propionate impurity is present in the product. This impurity is difficult to remove from the isolated cis- and trans-isomer products and it has the effect of lowering the yield of the more active trans-isomer. The present process does not utilize the aminobutadiene reactant. The quantity of the above mentioned propionate impurity, which is present in the reaction product of this invention, is lower than it is in products produced by the method of U.S. patent application Ser. No. 587,673; and somewhat better yields of the more active trans-isomer are achieved by the present method.

For a fuller understanding of the nature and objects of this invention, reference may be had to the following examples which are given merely as further illustrations of the invention and are not to be construed in a limiting sense.

EXAMPLE 1

(A) Reaction of crotonaldehyde, dimethylamine and ethyl atropate (atropic acid ethyl ester)

Into a 22-liter three-neck flask, equipped with a stirrer and thermometer, charge 2960 grams (42.3 mols) of anhydrous crotonaldehyde, 2120 ml. of anhydrous benzene, 10.6 grams of phenanthrenequinone, and 2920 grams (21.15 mols) of anhydrous potassium carbonate. Into this mixture, at 5° C., condense 955 grams (21.2 mols) of anhydrous dimethylamine over a two and one-half hour period. Upon completion, stir for 15 minutes and flush the system thoroughly with nitrogen. Add, all at once 3660 grams (18.95 mols) of ethyl atropate (91.2% purity by GLC) and heat to about 75° C. (15 minutes). Remove external heating and allow the reaction temperature to rise to 90° C. and control by external cooling. When the reaction is no longer exothermic, maintain at 90° C. to 95° C. for 2 hours.

Pour the reaction mixture into 21 liters of water contained in a 50-liter three-neck flask equipped with a stirrer and extract with 10.5 liters of benzene. Separate the benzene and discard the aqueous layer. Extract the benzene layer with 2 portions of 1 N hydrochloric acid (22 liters and 3 liters respectively). The benzene layer is discarded. The acid extracts are combined and washed with 4.5 liters of benzene. Separate the benzene layer and discard.

Basify the aqueous with 1.4 liter of 50% aqueous sodium hydroxide. Extract the aqueous with 2 portions of petroleum ether (11.5 liters and 6 liters respectively). Discard the aqueous layer. Combine the petroleum ether extracts and vigorously agitate with 31 liters of 10% aqueous sodium bisulfite for one and one-quarter hours.

Separate the organic layer and extract the aqueous with 4.7 liters of petroleum ether. Discard the aqueous. Combine the petroleum ether extracts and wash twice with 5-liter portions of water. Discard the aqueous. Dry the petroleum ether with magnesium sulfate, filter, and concentrate to totally remove petroleum ether under vacuum (on steam bath, 15 mm.) to a 4135-gram residue (80% of theoretical). Gas liquid chromatography indicates 60% cis isomer, 40% trans isomer, and less than 0.1% of ethyl 2-phenyl-3-dimethylaminopropionate.

Similarly, heterocyclic amines such as, pyrrolidino, morpholino, or piperidino may be substituted for the dimethylamine to produce the corresponding heterocyclic cyclohexene compounds.

(B) Isomer separation

Into a 50-liter three-neck flask, equipped with a stirrer and thermometer, charge 17.7 liters of 1 N hydrochloric acid. Heat to 65° C. and charge, all at once, 4.13 kg. of 3-dimethylamino - 4 - phenyl-4-carbethoxy-Δ¹-cyclohexene (60% cis/40% trans). Heat the resulting solution at 70° C. for one-half hour. Cool to 35° C. and extract with 3.15 liters of petroleum ether. Separate the aqueous and discard the petroleum ether extract. Treat the aqueous with 108 grams of charcoal, agitate for a few minutes and remove the charcoal by filtration. Dilute the filtrate to 24 liters and charge into a 50-liter three-neck flask equipped with a stirrer and addition funnel.

At 25° C. to 30° C., add all at once, 5.25 liters of a zinc chloride solution prepared from 2.06 kg. of zinc chloride, 10.4 liters of water, and 108 cc. of concentrated hydrochloric acid. Seed with cis isomer zinc complex and add the remainder of the zinc chloride solution over a 2 hour period. Upon completion, stir at 25° C. for 1 hour and maintain at 0° C. to 5° C. overnight.

Collect the zinc complex by filtration. Do not wash the cake. The wet cake weighs 3.65 kg. and weighs 3.4 kg. after drying at 60° C. to 65° C.

Into a 50-liter three-neck flask, equipped with a stirrer, charge 4.32 liters of ammonium hydroxide, 1.77 liters of water, and 75 cc. of 50% aqueous NaOH. Add the filtrate from the zinc chloride complex separation and stir at 25° C. for 15 minutes. Add 6 liters of petroleum ether and agitate for one-half hour. Separate the aqueous and extract with 2 to 3-liter portions of petroleum ether. Discard the aqueous. Wash the combined petroleum ether extracts twice with 4.5 liter and 2.3 liter portions of water. Dry the petroleum ether with magnesium sulfate, filter, and concentrate at 40° C. to 50° C./15 mm. to a residue of 1.63 kg. Gas liquid chromatography indicates 80% trans isomer, 20% cis isomer, and 0.25% ethyl 2-phenyl-3-dimethylaminopropionate.

(C) Hydrochloride preparation

Into a 22-liter three-neck flask, equipped with a stirrer, thermometer, and condenser, charge 9.2 liters of anhydrous ethyl acetate and 1.63 kg. (5.97 mols) of 3-dimethylamino - 4 - phenyl - 4 - carbethoxy-$\Delta^1$-cyclohexene (80% trans/20% cis). Rapidly add, all but 300 cc. of a solution of 219 grams (5.97 mols) of anhydrous hydrogen chloride in 2.22 liters of anhydrous ethyl acetate. Adjust the pH of the solution to 3.5–4 with the remaining ethyl acetate/hydrogen chloride solution. Upon completion, heat to reflux and reflux for one-half hour. Filter the hot mixture and immediately wash the cake with 1 liter of hot (75° C.) ethyl acetate. Finally, wash with 500 cc. of ethyl acetate (25° C.) and 4 liters of anhydrous ether. Dry at 65° C. to a constant weight of 1119 grams; M.P. 160° C. to 162° C. Thin layer chromatography indicates 1% to 2% of cis isomer and 0.25% to 0.5% of ethyl 2-phenyl-3-dimethylaminopropionate.

(D) Hydrochloride purification (1) The hydrochloride salt of the trans-isomer (containing 1% to 2% of cis-isomer and 0.25% to 0.5% ethyl 2-phenyl-3-dimethylaminopropionate), produced as described in Section (C) of this example, 1109 grams was charged with 8.87 liters of anhydrous tetrahydrofuran into a 12-liter three-neck flask, equipped with a stirrer and drying tube. The reaction was stirred at a temperature of 25° C. for a period of one hour. The product was collected by filtration, washed with 1 liter of anhydrous tetrahydrofuran and 4 liters of anhydrous ether. Upon drying at a temperature of 65° C., there was obtained 1011 grams of the hydrochloride salt of 3-trans-dimethylamino-4-phenyl-4-trans-carbethoxy-$\Delta^1$-cyclohexene melting point at 159° C. to 163° C. Thin layer chromatography indicated the presence of 0.75±0.25% cis-isomer and <0.25% of ethyl-2-phenyl-3-dimethylaminopropionate.

(2) Comparable results were achieved by using ethyl acetate in place of tetrahydrofuran in the hydrochloride salt purification method and heating the mixture at a temperature of 75° C.

EXAMPLE 2

(A) In this example, 174 grams (1.77 mol) of trans-2-hexenal, 122.5 grams (0.89 mol) of anhydrous potassium carbonate, 420 mg. of phenanthrenequinone and 90 ml. of benzene were charged into a suitable reaction vessel and the mixture was cooled to a temperature within the range of from about 3° C. to 5° C. Thereafter, 39.9 grams (0.89 mol) of anhydrous dimethylamine was introduced into the mixture over a period of about 45 minutes. When the addition of the amine was completed, 166 grams (0.8 mol) of ethyl atropate was added. The reaction mixture was then heated to a temperature of from about 90° C. to 95° C. and it was maintained at that temperature for a period of about 2 hours.

The reaction mixture, obtained as described in the preceding paragraph, was then poured into 900 ml. of water and extracted with 450 ml. of benzene. The separated benzene extract was extracted two times, using first, 1085 ml. and, second, 210 ml. of 1 N hydrochloric acid. The aqueous acid extracts were combined and washed with 350 ml. of benzene. The aqueous acid was then basified with 50% aqueous sodium hydroxide and extracted with 525 ml. and 280 ml. portions of petroleum ether.

The ether extracts were combined and washed, using vigorous agitation for 75 minutes, with 1350 ml. of aqueous sodium bisulfite solution. The ether was separated and washed twice with water, using 280 ml. portions each time. The ether was separated and dried over magnesium sulfate and filtered. The filtrate was concentrated until 112.5 grams of residue remained. By gas liquid chromatography it was determined that the residue contained 32.4% of 3-trans-dimethylamino - 4 - phenyl-4-trans-carbethoxy-6-ethyl-$\Delta^1$-cyclohexene (or ethyl trans-2-(dimethylamino)-5-ethyl - 1-phenyl-3-cyclohexene-1-carboxylate) and 66.5% of 3-cis-dimethylamino-4-phenyl-4-cis-carbethoxy-6-ethyl-$\Delta^1$-cyclohexene (or ethyl cis-2-(dimethylamino)-5-ethyl-1-phenyl-3-cyclohexene-1-carboxylate).

(B) The cis- and trans-isomer components of the reaction mixture were separated from each other in the following manner: 34.2 grams of the isomeric mixture, obtained as described in Section (A) of this example, containing 11.1 grams (0.037 mol) of the trans-base, were dissolved in 130 ml. of isopropanol. This solution was treated with a solution of 7.5 grams (0.0204 mol) of naphthalene-1,5-disulfonic acid 4⅓ $H_2O$ in 45 ml. of isopropanol at a temperature of about 60° C. The resulting salt of naphthalene-1,5-disulfonic acid and 3-trans-dimethylamino-4-phenyl-4-trans - carbethoxy - 6 - ethyl-$\Delta^1$-cyclohexene (or ethyl trans-2-(dimethylamino)-5-ethyl-1-phenyl-3-cyclohexene-1-carboxylate naphthalene sulfonate salt) was removed by filtration.

The filtrate from the foregoing step was concentrated to a residue and the essentially pure cis-isomer was decanted. This was dissolved in ether and washed with water. The ether was dried over magnesium sulfate, filtered and concentrated to a residue weighing 18.0 grams. The residue was then dissolved in anhydrous ether and treated with anhydrous hydrogen chloride. The resulting precipitate was collected and recrystallized from acetonitrile to yield 13.4 grams of 3-cis-dimethylamino-4-phenyl-4-cis-carbethoxy-6-ethyl-$\Delta^1$-cyclohexene hydrochloride (or ethyl cis-2-(dimethylamino)-5-ethyl-1-phenyl - 3 - cyclohexene-1-carboxylate hydrochloride, melting point 157° C. to 159° C. Thin layer chromatography indicated the presence of less than 0.2% of the trans-isomer.

(C) The isomeric mixture of Section (A) of this example, 50 grams, was dissolved in 500 ml. of anhydrous ether and the solution was treated with anhydrous hydrogen chloride until precipitation was complete. The mixed cis- and trans-hydrochlorides were collected and dried to a weight of 54.0 grams, melting point 148° C. to 165° C. This mixture was dissolved in 120 ml. of hot dioxane and allowed to cool slowly to a temperature of 25° C. It was held at that temperature for a period of about 3 minutes. The precipitate of crude 3-trans-dimethylamino-4-phenyl-4-trans-carbethoxy - 6 - ethyl-$\Delta^1$-cyclohexene hydrochloride (or ethyl trans-2-(dimethylamino)-5-ethyl-1-phenyl-3-cyclohexene-1-carboxylate hydrochloride) was collected in a yield of 13.0 grams, melting point at 201° C. to 203° C. The salt was recrystallized from methyl ethyl ketone to yield 9.7 grams of the trans hydrochloride, melting point 205.5° C. to 207° C. Gas liquid chromatography indicated the presence of less than 1% of the cis-isomer.

EXAMPLE 3

(A) In this example, 252.3 grams (3) mols) of tiglaldehyde, 207.3 grams (1.5 mol) of anhydrous potassium carbonate, 750 mg. of phenanthrenequinone and 150 ml. of benzene were charged into a reaction vessel and cooled to a temperature of from 3° C. to 5° C. Thereafter, 67.5 grams (1.5 mol) of anhydrous dimethylamine was introduced into the mixture over a period of about 75 minutes. When the addition of the amine was complete, 280 grams (1.35 mol) of ethyl atropate was added and the reaction mixture was introduced into a stainless steel autoclave (rocking) and maintained at a temperature of 150° C. to 160° C. for a period of 20 hours. At the end of that period of time, the mixture was poured into 1.5 liters of water and extracted with 750 ml. of benzene. The separated benzene extracts were then extracted two times, using 1.87 liter and 0.38 liter, respectively, of 1 N hydrochloric acid. The aqueous acid was basified with 50% aqueous sodium hydroxide and extracted with 900 ml. of petroleum ether.

The separated petroleum ether was subsequently agitated vigorously with 2.25 liters of 10% aqueous sodium bisulfite solution for a period of 75 minutes. The ether was separated, dried over magnesium sulfate and filtered. The filtrate was concentrated to a residue of 112.0 grams. The residue was further concentrated, by distillation, to a weight of 91.0 grams. The residue, containing a mixture of the cis- and trans-isomers, had a boiling point of 98° C. to 102° C./0.05 mm.

(B) The residue, obtained as described in Section (A) of this example, 91.0 grams (0.32 mol) was dissolved in 90 ml. of ethyl acetate. To the solution thus obtained there was added 11.6 grams (0.32 mol) of hydrogen chloride in 230 ml. of ethyl acetate. The resulting product comprising the mixture of cis- and trans-isomers, in the form of their hydrochloride salts, was collected and dried to a weight of 87.0 grams; melting point 157° C. to 160° C.

69.0 grams of the mixture of the hydrochloride salts of the cis- and trans-isomers were stirred with 70 ml. of 1 N hydrochloric acid for a period of about 5 minutes. At the end of that time, the resulting cis hydrochloride hydrate was collected by filtration and dried to a weight of 24.0 grams; melting point 45° C. to 55° C. The filtrate, which contained the trans-isomer in the form of its hydrochloride salt, was recovered and retained for subsequent isolation of that salt.

The cis hydrochloride hydrate, obtained as described in the preceding paragraph, was suspended in 300 ml. of xylene and heated to reflux temperature. Water of hydration was removed by means of a separator. Hydrogen chloride was also lost by this procedure. The xylene was concentrated to an oil which was dissolved in ether and treated with anhydrous hydrogen chloride until precipitation was complete. The precipitate, comprising the crude hydrochloride salt of the cis-isomer, was collected and dried to a weight of 17.3 grams; melting point 175.5° C. to 179° C. The crude product was recrystallized from methyl ethyl ketone to yield 9.8 grams of 2-methyl-3-cis-dimethylamino-4-phenyl - 4 - cis-carbethoxy-Δ¹-cyclohexene hydrochloride (or ethyl-cis-2-(dimethylamino)-3-methyl-1-phenyl-3-cyclohexene - 1 - carboxylate hydrochloride; melting at 185° C. to 187° C. Thin layer chromatography indicated the presence of 0.5% of the trans-isomer in the product.

The 1 N hydrochloric acid filtrate, i.e., the filtrate mentioned heretofore obtained when the cis-hydrochloride hydrate was isolated, was basified with 50% aqueous sodium hydroxide. The resulting base was extracted with ether, separated and dried over magnesium sulfate. The drying agent was removed by filtration and the filtrate was concentrated to provide a residue of 42.0 grams weight. The residue (0.15 mol) was dissolved in 40 ml. of ethyl acetate and a solution of 5.33 grams (0.15 mol) of hydrogen chloride in 100 ml. of ethyl acetate was added thereto. The crude trans-isomer, in the form of its hydrochloride salt, thus obtained was collected and dried to a weight of 44.5 grams; melting point 162° C. to 175° C. Recrystallization from methyl ethyl ketone yielded 26.5 grams of 2-methyl-3-trans-dimethylamino-4-phenyl-4-trans-carbethoxy-Δ¹-cyclohexene hydrochloride (or ethyl-trans-2-(dimethylamino) - 3 - methyl - 1 - phenyl-3-cyclohexene-1-carboxylate hydrochloride; melting point 184.5° C. to 186.5° C. Thin layer chromatography indicated the presence of 0.25% to 0.5% of the cis-isomer in the product.

It is understood that the foregoing detailed description is given merely by way of illustration and that many variations may be made therein without departing from the spirit of my invention.

Having described my invention, what I desire to secure by Letters Patent is:

1. A process for the production of a compound of the formula:

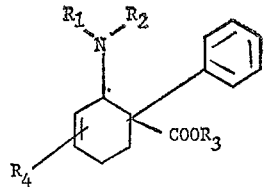

wherein $R_1$ is a lower alkyl group; wherein $R_2$ is a lower alkyl group; or wherein $R_1$ and $R_2$ taken together with the nitrogen atom to which they are attached form a heterocyclic ring system selected from the group consisting of pyrrolidino, morpholino and piperidino; wherein $R_3$ is a lower alkyl group and wherein $R_4$ is a hydrogen or a lower alkyl group which comprises the steps of (a) reacting an amine of the formula

wherein $R_1$ and $R_2$ are as previously defined with an aldehyde of the formula:

$$R_4CH_2CR_4=CR_4CHO$$

wherein $R_4$ is as previously defined in the presence of a dehydrating agent and at a temperature the range of from $-25°$ C. to $+30°$ C., there being used a ratio of from 0.5 to 1.0 mol of said amine for each mol of aldehyde present in the reaction mixture and (b) heating the reaction product thus obtained with an ester having the formula:

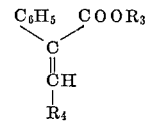

wherein $R_3$ and $R_4$ are as previously defined at a temperature within the range of from 50° C. to 160° C., there being used a ratio of 0.45 mol of said ester for each mol of aldehyde used in step (a) of the process.

2. The process of claim 1 wherein the reaction of the amine and aldehyde is carried out in the presence of a catalytic quantity of a quinone catalyst.

3. The process of claim 1 wherein the dehydrating agent is potassium carbonate.

4. The process of claim 1 wherein, in an additional step, the reaction product is washed with an aqueous solution of an alkali metal bisulfite.

5. The process of claim 2 wherein the quinone catalyst is phenanthrenequinone.

6. The process of claim 4 wherein the aqueous alkali metal bisulfite solution is a 10% aqueous solution of sodium bisulfite.

7. The process of claim 5 wherein the amine reactant is dimethylamine, wherein the aldehyde reactant is crotonaldehyde and wherein the ester reactant is ethyl atropate.

8. The process of claim 5 wherein the amine reactant is dimethylamine, wherein the aldehyde reactant is trans-2-hexenal and wherein the ester reactant is ethyl atropate.

9. The process of claim 5 wherein the amine reactant is dimethylamine, wherein the aldehyde reactant is tiglaldehyde and wherein the ester reactant is ethyl atropate.

10. A process for producing the hydrochloride salt of the trans-isomer of a compound having the formula:

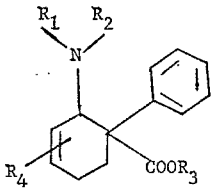

in which $R_1$ is a lower alkyl group; in which $R_2$ is a lower alkyl group; or in which $R_1$ and $R_2$ taken together with the nitrogen atom to which they are attached form a heterocyclic ring system selected from the group consisting of pyrrolidino, morpholino and piperidino; in which $R_3$ is a lower alkyl group; and in which $R_4$ is hydrogen or a lower alkyl group which comprises mixing hydrogen chloride, the trans-isomer and ethyl acetate, said mixture being adjusted to a pH of from 3.5 to 4.0, heating the resulting mixture at reflux temperature and filtering the mixture while hot to recover the hydrochloride salt of the trans-isomer.

11. A process for purifying the hydrochloride salt of the trans-isomer of a compound having the formula:

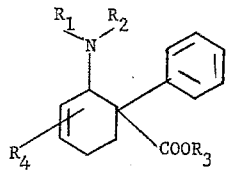

in which $R_1$ is a lower alkyl group; in which $R_2$ is a lower alkyl group; or in which $R_1$ and $R_2$ taken together with the nitrogen atom to which they are attached form a heterocyclic ring system selected from the group consisting of pyrrolidino, morpholino and piperidino; in which $R_3$ is a lower alkyl group; and in which $R_4$ is hydrogen or a lower alkyl group which comprises stirring the salt in tetrahydrofuran at a temperature up to 25° C. and recovering the pure salt by filtration.

12. A process for purifying the hydrochloride salt of the trans-isomer of a compound having the formula:

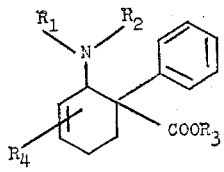

in which $R_1$ is a lower alkyl group; in which $R_2$ is a lower alkyl group; or in which $R_1$ and $R_2$ taken together with the nitrogen atom to which they are attached form a heterocyclic ring system; in which $R_3$ is a lower alkyl group; and in which $R_4$ is hydrogen or a lower alkyl group which comprises stirring the salt in ethyl acetate at a temperature of up to 75° C. and recovering the pure salt by filtration.

References Cited

Langerbeck, et al., Ber. 75 pp. 232–6 (1942).

JAMES A. PATTEN, Primary Examiner

E. J. GLEIMAN, Assistant Examiner

U.S. Cl. X.R.

260—294.3 E, 326.3, 471 R; 424—248, 267, 274, 309